United States Patent
Blatseas et al.

(10) Patent No.: US 8,042,855 B2
(45) Date of Patent: Oct. 25, 2011

(54) LATERAL SLIDE VEHICLE SEAT

(75) Inventors: Spyridon G. Blatseas, Dublin, OH (US); Ross L. Burghardt, Marysville, OH (US); Ronald C. Cozzo, Delaware, OH (US); Brian E. Dressel, Dublin, OH (US); Rudy M. Mayne, Jr., Hilliard, OH (US); Osamu Kyogoku, Dublin, OH (US); Yasuhiro Iwaki, Tokyo (JP); William C. Lanz, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 76 days.

(21) Appl. No.: 12/624,912

(22) Filed: Nov. 24, 2009

(65) Prior Publication Data

US 2011/0121603 A1 May 26, 2011

(51) Int. Cl.
*B60N 2/02* (2006.01)
(52) U.S. Cl. .................................. 296/65.11
(58) Field of Classification Search ........... 296/65.11, 296/65.03, 65.01, 65.05, 63, 65.09, 65.16; 297/378.12, 15, 378.13; 248/503.1
See application file for complete search history.

(56) References Cited

U.S. PATENT DOCUMENTS

| | | | |
|---|---|---|---|
| 5,364,152 A | 11/1994 | Mastrangelo et al. | |
| 5,575,532 A | 11/1996 | Von Rolbicki et al. | |
| 5,975,611 A * | 11/1999 | Hoshihara et al. | 296/65.03 |
| 6,024,398 A | 2/2000 | Horton et al. | |
| 6,089,641 A * | 7/2000 | Mattarella et al. | 296/64 |
| 6,161,890 A * | 12/2000 | Pesta et al. | 296/65.01 |
| 6,227,619 B1 * | 5/2001 | Pesta et al. | 297/378.12 |
| 6,286,886 B1 * | 9/2001 | Odagaki | 296/65.11 |
| 6,345,867 B1 | 2/2002 | Hellrung et al. | |
| 6,431,632 B1 * | 8/2002 | Kozikowski et al. | 296/65.03 |
| 6,572,172 B1 | 6/2003 | Ninomiya et al. | |
| 6,609,745 B2 * | 8/2003 | Miyahara et al. | 296/65.11 |
| 6,648,393 B1 | 11/2003 | Milnar et al. | |
| 6,685,269 B1 | 2/2004 | Freijy et al. | |

(Continued)

FOREIGN PATENT DOCUMENTS

JP 2008239088 10/2008

OTHER PUBLICATIONS

International Search Report of PCT/US2010/056332 dated Jan. 14, 2011.

(Continued)

*Primary Examiner* — Kiran B. Patel
(74) *Attorney, Agent, or Firm* — Rankin Hill & Clark LLP

(57) ABSTRACT

An adjustable vehicle seat arrangement includes a plurality of strikers connected with a vehicle frame, an inboard vehicle seat, and an outboard vehicle seat. At least one outboard seat rear striker includes a latching section divider dividing the outboard seat rear striker into at least two laterally spaced apart latching sections. The outboard vehicle seat includes an outboard seat rear latch that cooperates with the outboard seat rear striker and an outboard seat front latch that cooperates with an outboard seat front striker. The outboard seat is generally laterally aligned with and laterally offset from the inboard seat. The outboard seat is laterally adjustable and the outboard seat rear latch is configured to engage the outboard seat rear striker at each of the at least two laterally spaced apart latching sections. A method for laterally adjusting a vehicle seat and a vehicle seat assembly are also disclosed.

15 Claims, 8 Drawing Sheets

U.S. PATENT DOCUMENTS

| | | |
|---|---|---|
| 6,843,526 B2 | 1/2005 | Honda et al. |
| RE38,845 E | 10/2005 | Odagaki |
| 7,083,214 B2 | 8/2006 | Hayakawa et al. |
| 7,137,670 B2 * | 11/2006 | Gupta et al. ............. 297/452.65 |
| 7,204,554 B2 | 4/2007 | Wieclawski |
| 7,296,840 B2 * | 11/2007 | Martone et al. ............ 296/65.03 |
| 7,438,339 B2 | 10/2008 | Abraham |
| 7,909,372 B2 * | 3/2011 | Yamada ........................ 292/340 |
| 2001/0038223 A1 | 11/2001 | Suga et al. |
| 2003/0001404 A1 | 1/2003 | Michel |
| 2005/0017564 A1 | 1/2005 | Kayumi |
| 2006/0076795 A1 | 4/2006 | Slade |
| 2008/0238125 A1 | 10/2008 | Mahaffy |
| 2010/0295353 A1 * | 11/2010 | Tame ............................ 297/340 |

OTHER PUBLICATIONS

Written Opinion of PCT/US2010/056332 dated Jan. 14, 2011.

* cited by examiner

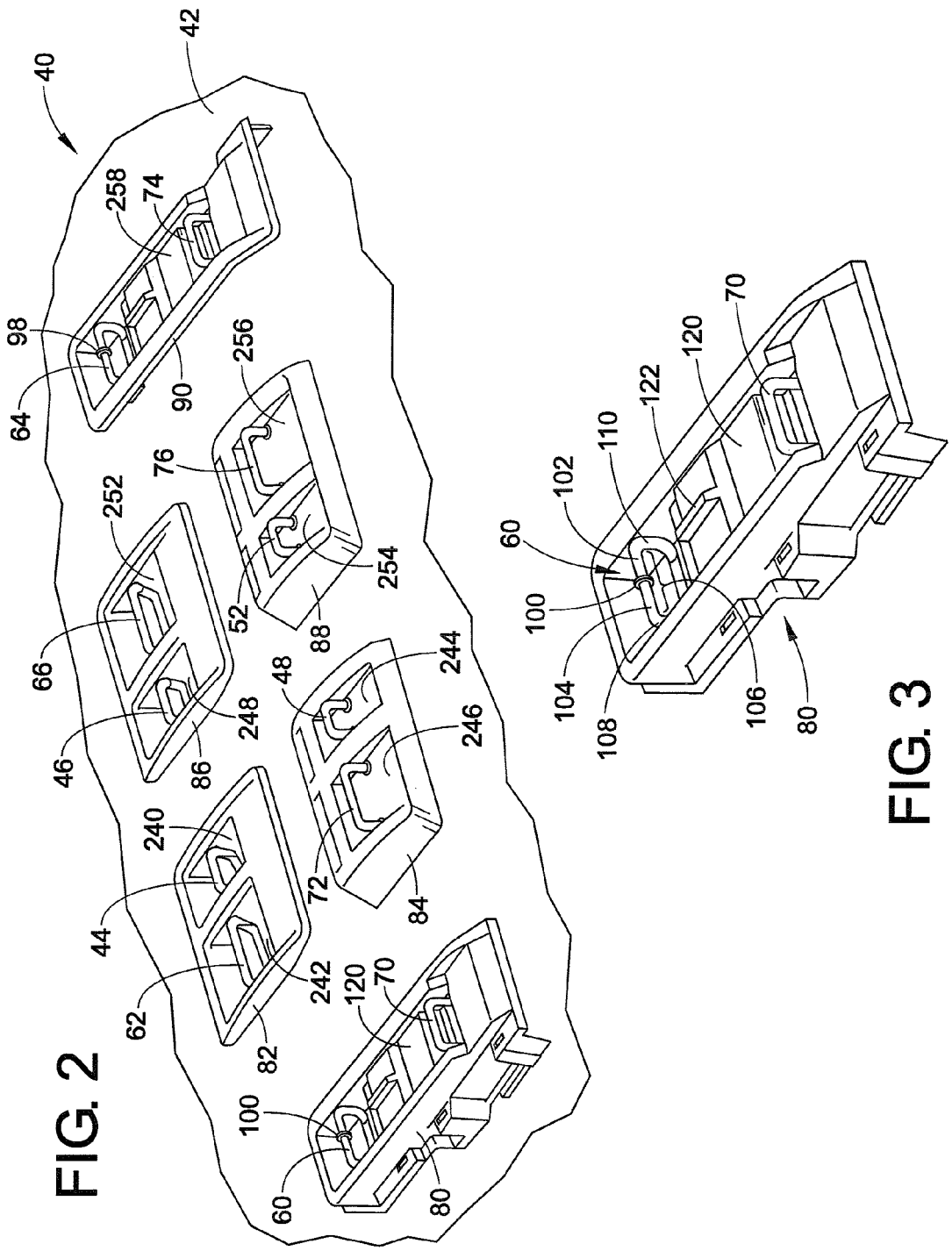

LATERAL SLIDE VEHICLE SEAT

BACKGROUND

The present disclosure generally relates to vehicle seats found in larger vehicles, such as vans, minivans, and sport utility vehicles. These larger vehicles can include three rows of vehicle seats: a first row of seats where the driver is located, a second row of seats behind the first row, and a third row of seats behind the second row. Ingress to and egress from the third row of seats can be difficult. Where the second row, also referred to as the mid-row seats, includes two outboard seats, these outboard seats pivot or tumble forward to allow a passenger access to and from the third row of seats. The outer most edge of each outboard seat, however, is situated near side frame pillars of the vehicle. Accordingly, little room may still be provided for ingress to and egress from the third row seats.

Decreasing the width of the outboard seats in the second row of seats can provide more space for ingress and egress. This, however, can lead to problems with child restraint systems, which can be commonly referred to as child seats. These known child seats typically rest on a vehicle seat and are latched thereto. A minimum width for supporting child seats on these second row seats is desirable; therefore, decreasing the width of the outboard seat may not be practicable.

BRIEF DESCRIPTION

An adjustable vehicle seat arrangement that can overcome the aforementioned short comings includes a plurality of strikers connected with a vehicle frame, an inboard vehicle seat, and an outboard vehicle seat. The plurality of strikers includes at least two outboard seat rear strikers and an outboard seat front striker. At least one of the outboard seat rear strikers includes a latching section divider dividing the at least one outboard seat rear striker into at least two laterally spaced apart latching sections. The inboard vehicle seat mounts to the vehicle frame. The outboard vehicle seat includes at least two outboard seat rear latches that each cooperates with a respective outboard seat rear striker and an outboard seat front latch that cooperates with the outboard seat front striker. The outboard seat is generally laterally aligned with and laterally offset from the inboard seat. The outboard seat is laterally adjustable and at least one of the outboard seat rear latches is configured to engage the at least one outboard seat rear striker at each of the at least two laterally spaced apart latching sections.

A method for laterally adjusting a vehicle seat can include disengaging a rear latch of a vehicle seat from a rear striker, pivoting the vehicle seat away from the rear striker, moving the vehicle seat laterally while the rear latch is disengaged from the rear striker, and engaging the rear latch to the rear striker. The method can include disengaging the rear latch of a vehicle seat from the rear striker, which is connected to a vehicle frame. The method can further include pivoting the vehicle seat away from the rear striker while a front latch of the vehicle seat remains engaged with a front striker that is connected to the vehicle frame. The method can further include moving the vehicle seat laterally while the rear latch is disengaged from and the rear latch is pivoted away from the rear striker and the front latch is engaged with the front striker.

A vehicle seat assembly includes a vehicle seat, a rear striker, and a front striker. The vehicle seat is operable in a first lateral position and a second lateral position, which is offset laterally from the first lateral position. The vehicle seat includes a rear latch and a front latch for securing the seat to a vehicle frame. The rear striker cooperates with the rear latch for securing the vehicle seat to the vehicle frame. The rear striker includes a generally cylindrical horizontal section and a substantially annular latching section divider dividing the horizontal section into a first latching section and a second latching section. The rear latch engages the first latching section when the vehicle seat is in the first lateral position and the rear latch engages the second latching section when the vehicle seat is in the second lateral position. The front striker cooperates with the front latch for securing the vehicle seat to the vehicle frame.

BRIEF DESCRIPTION OF THE DRAWINGS

FIG. 2 is a perspective view of a mid-row striker arrangement for a vehicle.

FIG. 3 is a close-up perspective view of a right-hand outer striker arrangement for the mid-row striker arrangement shown in FIG. 2.

DETAILED DESCRIPTION

Figure 1:
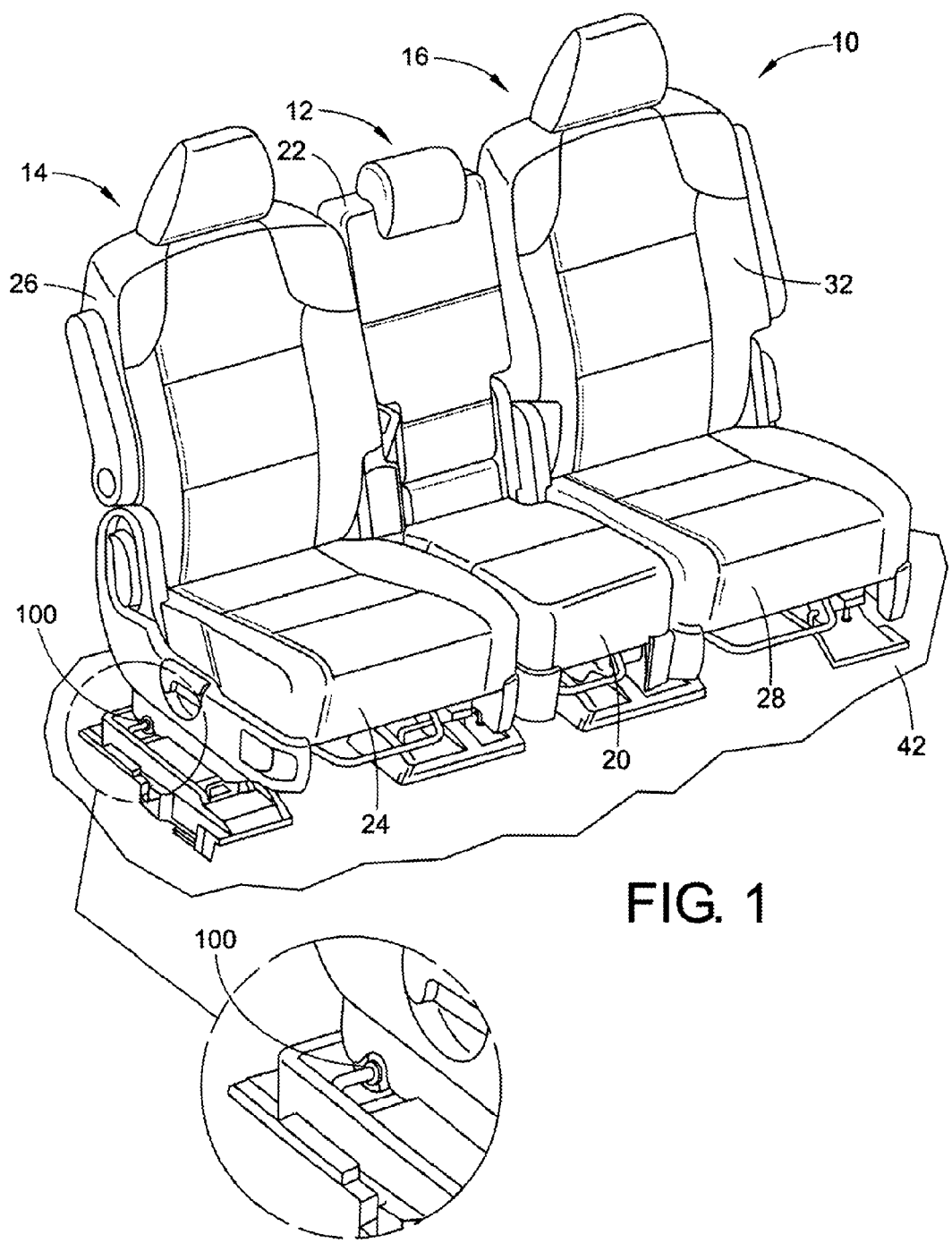
FIG. 1 is a perspective view of a mid-row seat arrangement for a vehicle showing an outboard vehicle seat in a first position.
Figure 1A:
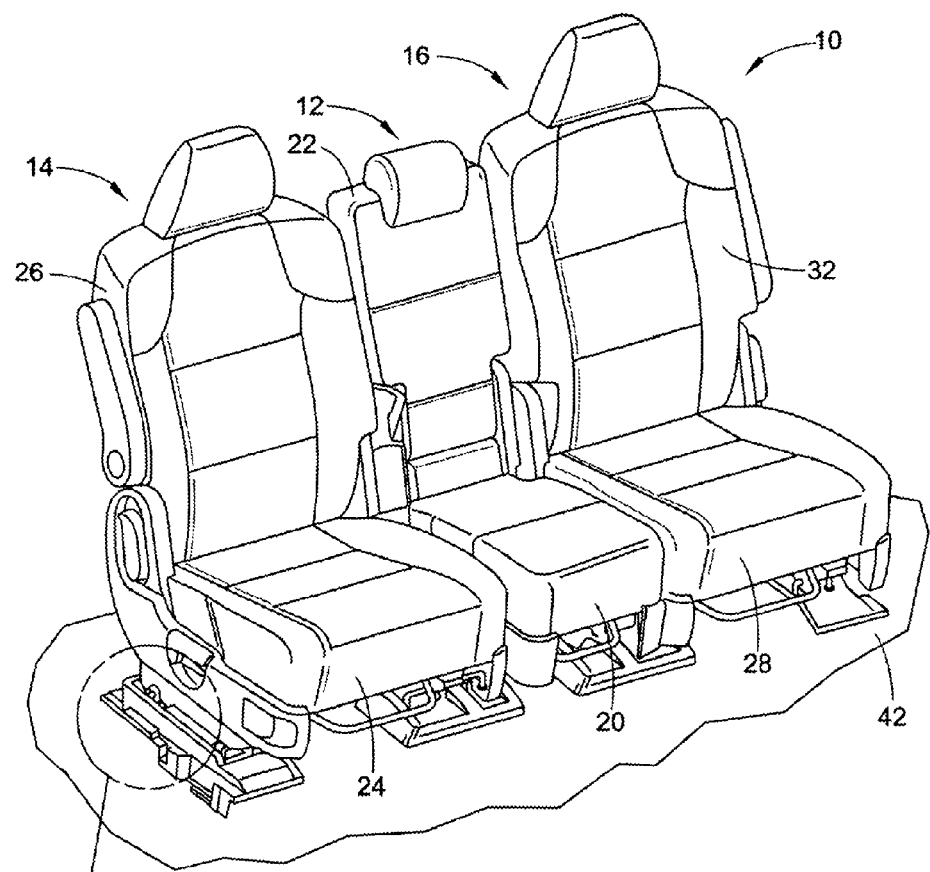
FIG. 1A shows the outboard vehicle seat in the second position.

With reference to FIG. 1, a mid-row seat arrangement 10 for a vehicle is shown including an inboard (center) vehicle seat 12 and an outboard vehicle seat, which in the depicted embodiment includes a right-hand seat 14 and a left-hand seat 16. For example, the mid-row seat arrangement can be the second row of seats in a van, a minivan, or an SUV. Each outboard seat 14, 16 is generally laterally aligned with, i.e. in the same row, and laterally off-set from the inboard seat 12. In the illustrated embodiment, the inboard seat 12, which can also be referred to as a center seat, includes a seat base 20 and a seat back 22. The right-hand seat 14 also includes a seat base 24 and a seat back 26. The left-hand seat 16 also includes a seat base 28 and a seat back 32. Each of the seat backs 22, 26, and 32 can pivot with respect to the respective base 20, 24, and 28 in a conventional manner.

With reference to FIG. 2, a mid-row striker arrangement 40 is shown. The mid-row striker arrangement 40 includes a plurality of U-shaped strikers connected with a vehicle frame (not shown) and located on a vehicle floor 42. Each of the strikers in the illustrated embodiment is made from a metal bar, which is circular in cross section. If desired, at least some of the rear strikers, which will be described in more detail below, could attach to the vehicle frame elsewhere. The mid-row striker arrangement 40 includes an inboard seat rear striker, which in the illustrated embodiment includes an inboard seat right-hand rear striker 44 and an inboard seat left-hand rear striker 46. The illustrated mid-row striker arrangement 40 also includes an inboard seat front striker, which in the depicted embodiment includes an inboard seat right-hand front striker 48 and an inboard seat left-hand front striker 52.

The plurality of strikers that make up the mid-row striker arrangement 40 also includes outboard seat rear strikers, which in the depicted embodiment includes a right-hand seat outer rear striker 60, a right-hand seat inner rear striker 62, a left-hand seat outer rear striker 64, and a left-hand seat inner rear striker 66. The plurality of strikers that make up the mid-row striker arrangement 40 in the illustrated embodiment also includes outboard seat front strikers, which in the depicted embodiment includes a right-hand seat outer front striker 70, a right-hand seat inner front striker 72, a left-hand seat outer front striker 74, and a left-hand seat inner front striker 76.

With continued reference to FIG. 2, the vehicle seat arrangement also includes a mid-row garnish arrangement including an outer right-hand garnish 80, an inner right-hand rear garnish 82, an inner right-hand front garnish 84, an inner left-hand rear garnish 86, an inner left-hand front garnish 88, and an outer left-hand garnish 90. The garnishes 80, 82, 84, 86, 88, and 90 in the depicted embodiment are made of plastic and attach to the vehicle floor 42 in a conventional manner. The right-hand seat outer rear striker 60 and the right-hand seat outer front striker 70 each extend through openings found in the outer right-hand garnish 80. The inboard seat right rear striker 44 and the right-hand seat inner rear striker 62 each extend through openings found in the inner right-hand rear garnish 82. The inboard seat right front striker 48 and the right-hand seat inner front striker 72 extend through openings found in the inner right-hand front garnish 84. The inboard seat right-rear striker 46 and the left-hand seat inner rear striker 66 each extend through openings found in the inner left-hand rear garnish 86. The inboard seat left-front striker 52 and the left-hand seat inner front striker 76 each extend through openings found in the inner right-hand front garnish 88. The left-hand seat outer rear striker 64 and the left-hand seat outer front striker 74 each extend through openings found in the outer left-hand garnish 90. The outer right-hand garnish 80 can be a mirror image of the outer left-hand garnish 90. The inner right-hand rear garnish 82 can be a mirror image of the inner left-hand rear garnish 86. The inner right-hand front garnish 84 can be a mirror image of the inner left-hand front garnish 88.

The plurality of generally U-shaped strikers 44, 46, 48, 52, 60, 62, 64, 66, 70, 72, 74, and 76 include at least two outboard seat rear strikers, e.g. strikers 60, 62, 64 and 66, and at least two outboard seat front strikers, e.g. strikers 70, 72, 74 and 76. In the illustrated embodiment, at least one of the outboard seat rear strikers, e.g. strikers 60 and 64, includes a latching section divider 100 and 98, respectively, dividing the at least one outboard seat rear striker into at least two laterally spaced apart latching sections, which will be described in more detail below.

Figure 4:
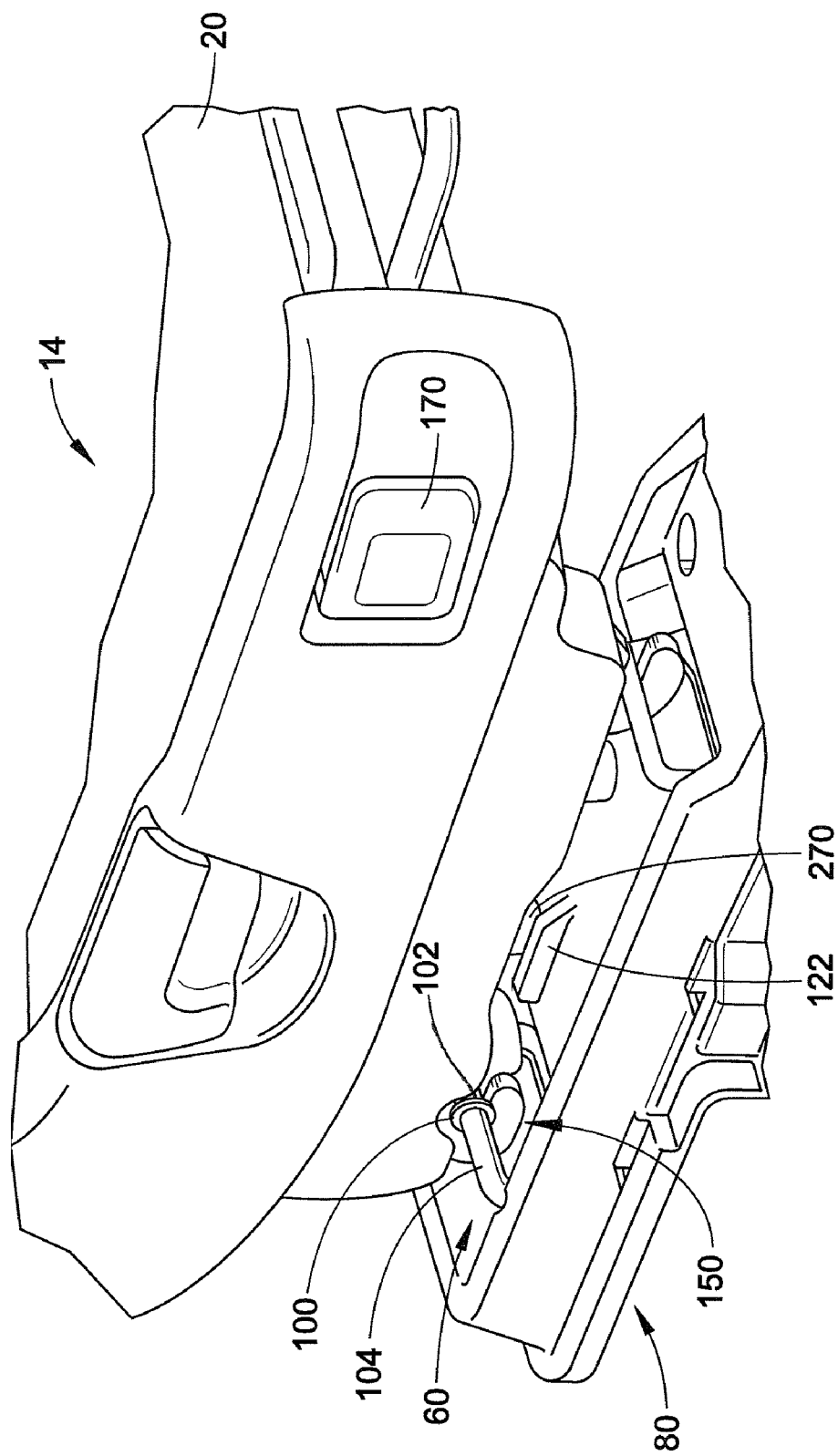
FIG. 4 is a perspective view of a lower portion of a right-hand seat of the mid-row seat arrangement shown in FIG. 1 and a portion of the right-hand outer striker arrangement shown in FIG. 3.
Figure 5:
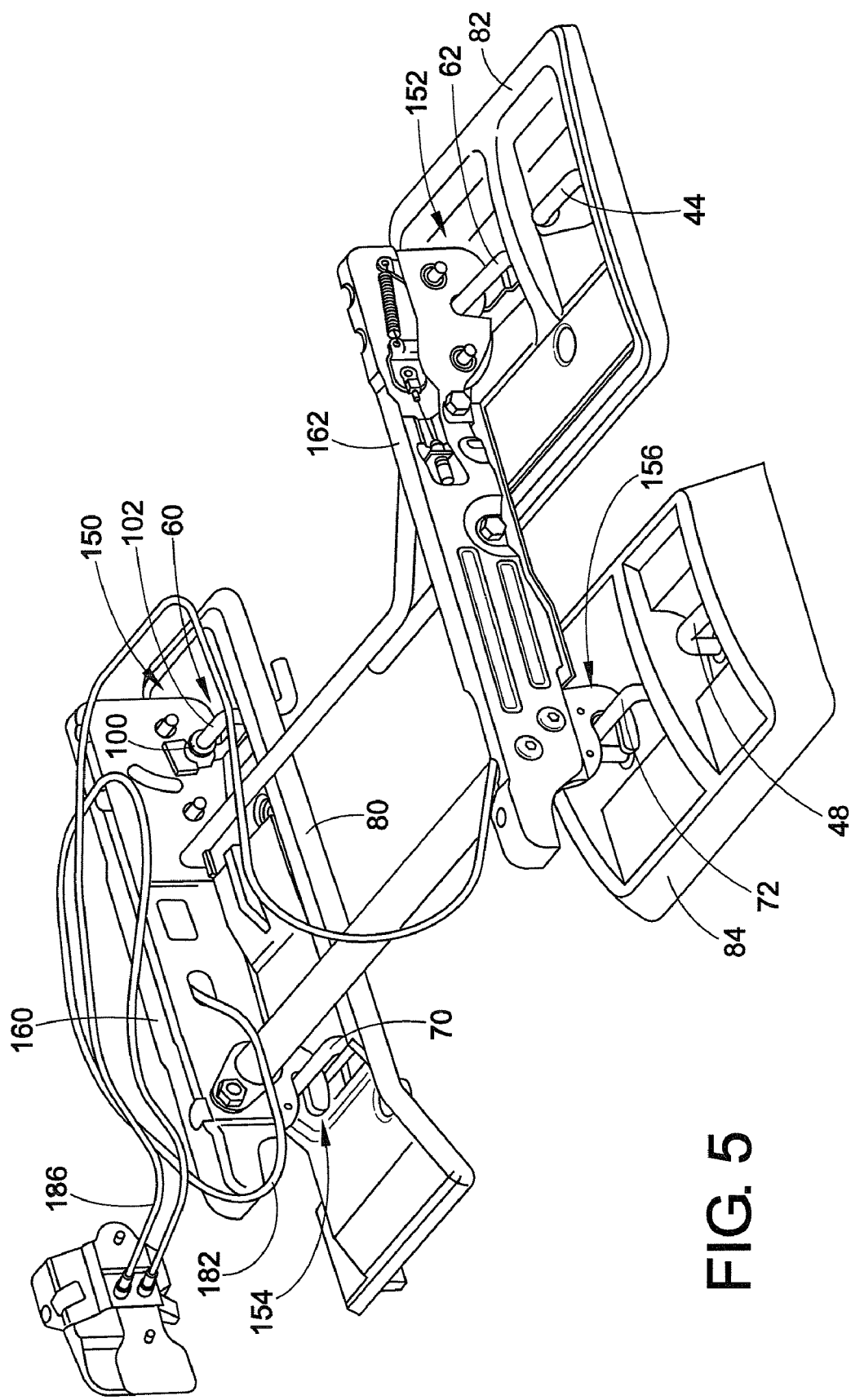
FIG. 5 is a perspective view of components of the right-hand seat shown in FIG. 1 and portions of the striker arrangement shown in FIG. 2.

Reference will now be made to FIGS. 3-5, which depicts components of the right-hand seat 14 connecting with the vehicle floor 42 (and thus the vehicle frame, which is connected with the vehicle floor). The left-hand seat 16 connects in a similar manner; therefore the components depicted in FIGS. 3-5 will be described in particularity with the understanding that the left-hand seat can take a similar configuration.

As more clearly seen in FIG. 3, the right-hand seat outer rear striker 60, which is one of the aforementioned outboard seat rear strikers, includes the latching section divider 100 dividing the right-hand seat outer rear striker into at least two laterally spaced apart latching sections, which in the depicted embodiment is a first (inner) latching section 102 and a second (outer) latching section 104. As discussed above, each of the strikers is generally U-shaped, and as depicted in FIG. 3 the right-hand seat outer rear striker 60 includes a generally cylindrical horizontal section 106, which includes the latching sections 102 and 104. The right-hand seat outer rear striker 60 also includes generally vertically oriented sections 108 and 110 that can be fixed, e.g. welded to the vehicle frame.

In the illustrated embodiment, the latching section divider 100 is an annular ridge. The annular ridge 100 surrounds the generally cylindrical horizontal section 106 and is disposed in the lateral center between the outer vertical section 108 and the inner vertical section 110. In alternative embodiments, the latching section dividers 98, 100 can be located elsewhere on the respective horizontal section and the latching section divider can take alternative configurations such as a protrusion, which may not be an annular ridge that completely surrounds the horizontal section, that extends from the generally horizontal section.

With reference back to FIG. 3, the outer right-hand garnish 80 defines a well 120 in which the right-hand seat outer rear striker 60 and the right-hand seat outer front striker 70 are received. The well 120 has a lateral dimension that allows for lateral adjustment of the right-hand seat 14. This lateral adjustment will be described in more detail below. The outer right-hand garnish 80 also includes a locator wall 122 aligned with the latching section divider 100 in a longitudinal direction, which is generally parallel to a direction of travel for the vehicle in which the mid-row seat arrangement 10 (FIG. 1) is found. In the illustrated embodiment the locator wall 122 is disposed between the rear striker 60 and the front striker 70 within the well 120. Also in the depicted embodiment, the width of the locator wall 122 as measured in the lateral direction is substantially equal to the width of the latching section divider 100, which is also measured in a lateral (axial) direction. The locator wall 120 cooperates with the right-hand seat 14 to locate the right-hand seat in a lateral direction in a manner that will be described in more detail below.

With reference back to FIG. 1, the center vehicle seat 12 attaches to the strikers 44, 46, 48, and 52 (FIG. 2) in a conventional manner, which allows the inboard (center) vehicle seat 12 to mount to the vehicle frame (not shown). The center seat 12 includes front latches (not visible) that cooperate with the center seat front strikers 48 and 52 (FIG. 2) and rear latches (not visible) that cooperate with the center seat rear latches 44 and 46 (FIG. 2). The center seat rear latches (not visible) can detach from the center seat rear strikers 44 and 46 so that the center seat 12 pivots about an axis generally defined by the center seat front strikers 48 and 50 in a conventional manner.

The right-hand seat 14, which as mentioned above can also be referred to as an outboard vehicle seat, includes at least two outboard seat rear latches that each cooperates with a respective outboard seat rear striker and at least two outboard seat front latches that each cooperate with a respective outboard seat front striker. The right-hand seat latches will be described with reference to FIGS. 4-7. The left-hand seat 16 also includes latches (not visible in the FIGS.) that operate in a similar manner. The right-hand seat latches will be described in detail with the understanding that the left-hand seat latches operate in a similar manner.

With reference to FIG. 5, in the illustrated embodiment a right-hand seat outer rear latch 150 cooperates with the right-hand seat outer rear striker 60 and a right-hand seat inner rear latch 152 cooperates with the right-hand seat inner rear striker 62. Also, a right-hand seat outer front latch 154 cooperates with the right-hand seat outer front striker 70 and a right-hand seat inner front latch 156 cooperates with the right-hand seat inner front striker 72. In the illustrated embodiment, the rear latches 150 and 152 include movable components, which will be described in more detail below, that allow the rear latches to disengage from the respective rear strikers 60 and 62. When the rear latches 150 and 152 are disengaged from the rear strikers 60 and 62, the front latches 154 and 156 remain engaged with the front strikers 70 and 72. This is because the front latches 70 and 72 are fixed to a respective riser 160, 162, which makes up a component of the right-hand seat 14.

Figure 6:
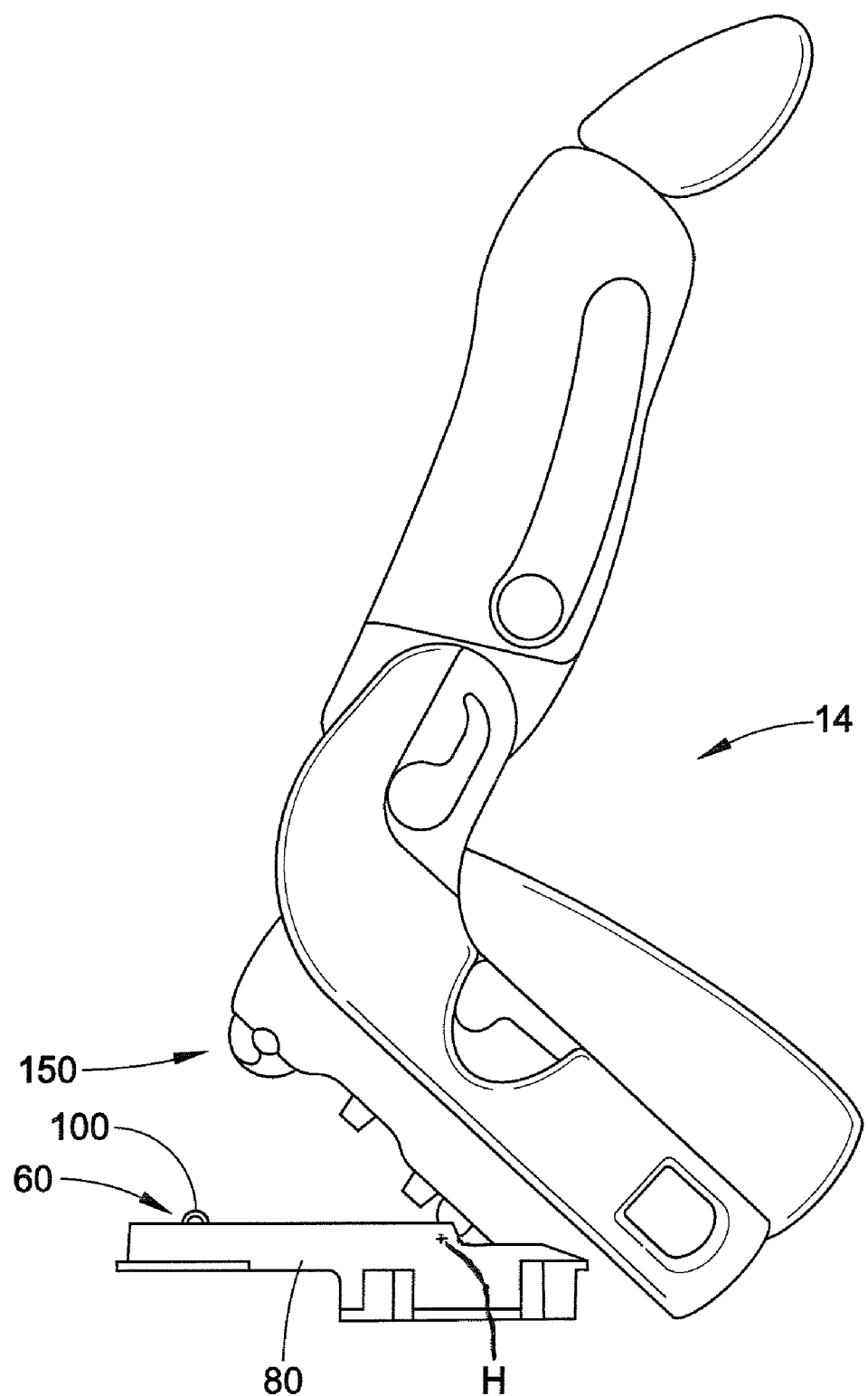
FIG. 6 is a side elevation of the right-hand seat shown in FIG. 1 and the right-hand outer striker arrangement shown in FIG. 3.

With reference to FIG. 6, the right-hand seat 14 (as well as the left-hand seat 16) is pivotable about an axis H generally defined by the right-hand seat front strikers 70, 72 (FIG. 5). Unlike known laterally adjustable seats, the right-hand seat 14 is adjustable in the lateral direction with only one of the set of latches, more particularly the rear latches 150 and 152 being disengaged from the respective strikers. Accordingly, when the right-hand seat rear latches 150 and 152 are disengaged from the respective rear strikers 60 and 62 and the right-hand seat front latches 154 and 156 are engaged with the respective front strikers 70 and 72, the right-hand seat 14 is pivotable about the axis H that is generally defined by the front strikers 70, 72 and the vehicle is now movable in a lateral direction, which is generally parallel to the axis H and perpendicular to the longitudinal direction.

The right-hand seat rear latch 150 is operable in a first operating position, a second operating position, and a third operating position. In the first operating position (see FIG. 4), the right-hand seat outer rear latch 150 engages the right-hand seat outer rear striker 60 at the first latching section 102. In the second operating position, the right-hand seat outer rear latch 150 engages the right-hand seat rear striker 60 at a second section 104 (see FIG. 5). In the third operating position (FIG. 6), the right-hand seat outer rear latch 150 is disengaged from the right-hand seat outer rear striker 60. The latching section divider 100 can contact the right-hand seat outer rear latch 150 to preclude lateral movement of the right-hand seat outer rear latch from the first latching section 102 toward the second latching section 104 when the right-hand seat outer rear latch is in the first operating position (shown in FIG. 4). Similarly, the latching section divider 100 can contact the right-hand seat outer rear latch 150 to preclude lateral movement of the right-hand seat outer rear latch from the second latching section 104 toward the first latching section 102 when the right-hand seat outer rear latch is in the second operating position.

Figure 7:
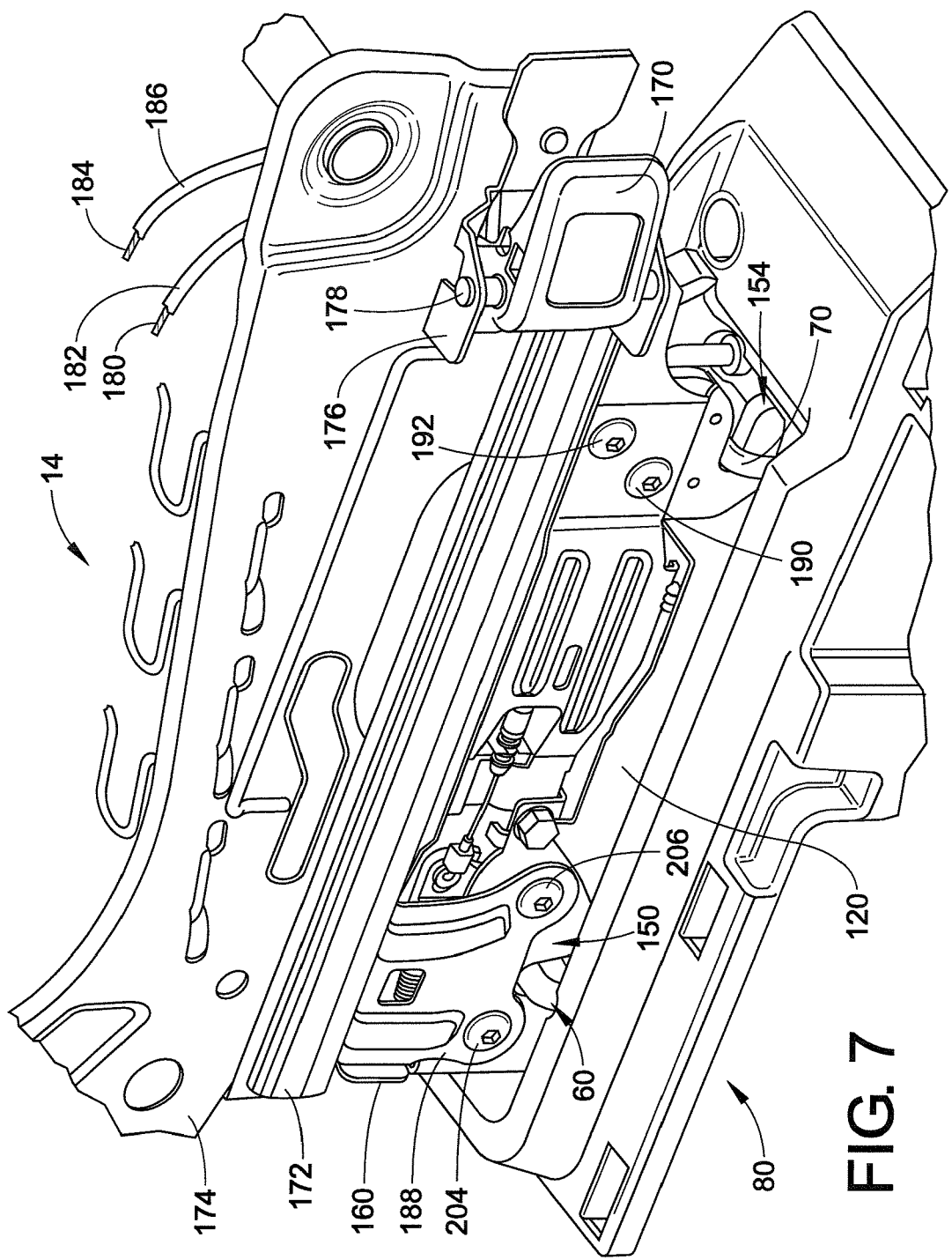
FIG. 7. is a perspective view of internal components of the right-hand seat shown in FIG. 1 and the right-hand outer striker arrangement shown in FIG. 3.

With reference to FIG. 7, operation of the right-hand seat outer rear latch 150 will be described in more detail. As mentioned above, the left-hand seat 16, which is the other outboard seat in the depicted embodiment, includes an outer rear latch that operates in much the same manner. The right-hand seat outer rear latch 150 mounts to the outer riser 160 and is operated by a lever arm 170, which is operably connected with the right-hand seat outer rear latch. The right-hand seat 14 depicted in FIG. 7 includes the riser 160, a track 172 connected with the riser 160 (two tracks are provided in each outboard seat) and a cushion frame 174 attached to the track. The cushion frame 174 and the track(s) 172 cooperate in a manner that allows for longitudinal adjustment of the right seat 14 with respect to the vehicle frame. The lever arm 170 attaches to the cushion frame 174 in the illustrated embodiment via a bracket 176 and a vertically aligned pin, or axle 178. The bracket 176 is fixed to the cushion frame 174 and the pin 178 connects with the bracket to allow the lever arm 170 to pivot about a vertical axis defined by the pin. In the illustrated embodiment two cables, a first cable 180 covered by a first sheath 182 and a second cable 184 covered by a second sheath 186, connect at one end to the lever arm 170 and at another end to a respective rear latch 150, 152 (see also FIG. 5). With continued reference to FIG. 7, the right-hand seat outer rear latch 150 connects to the riser 160 using a bracket 188. The right-hand seat outer front latch 154 is fixed to the riser 160 via fasteners 190 and 192 so that the right-hand seat inner front latch 154 moves along with the riser 172 (along with the remainder of the right seat 14) when the seat is moved laterally or pivoted.

Figure 8:
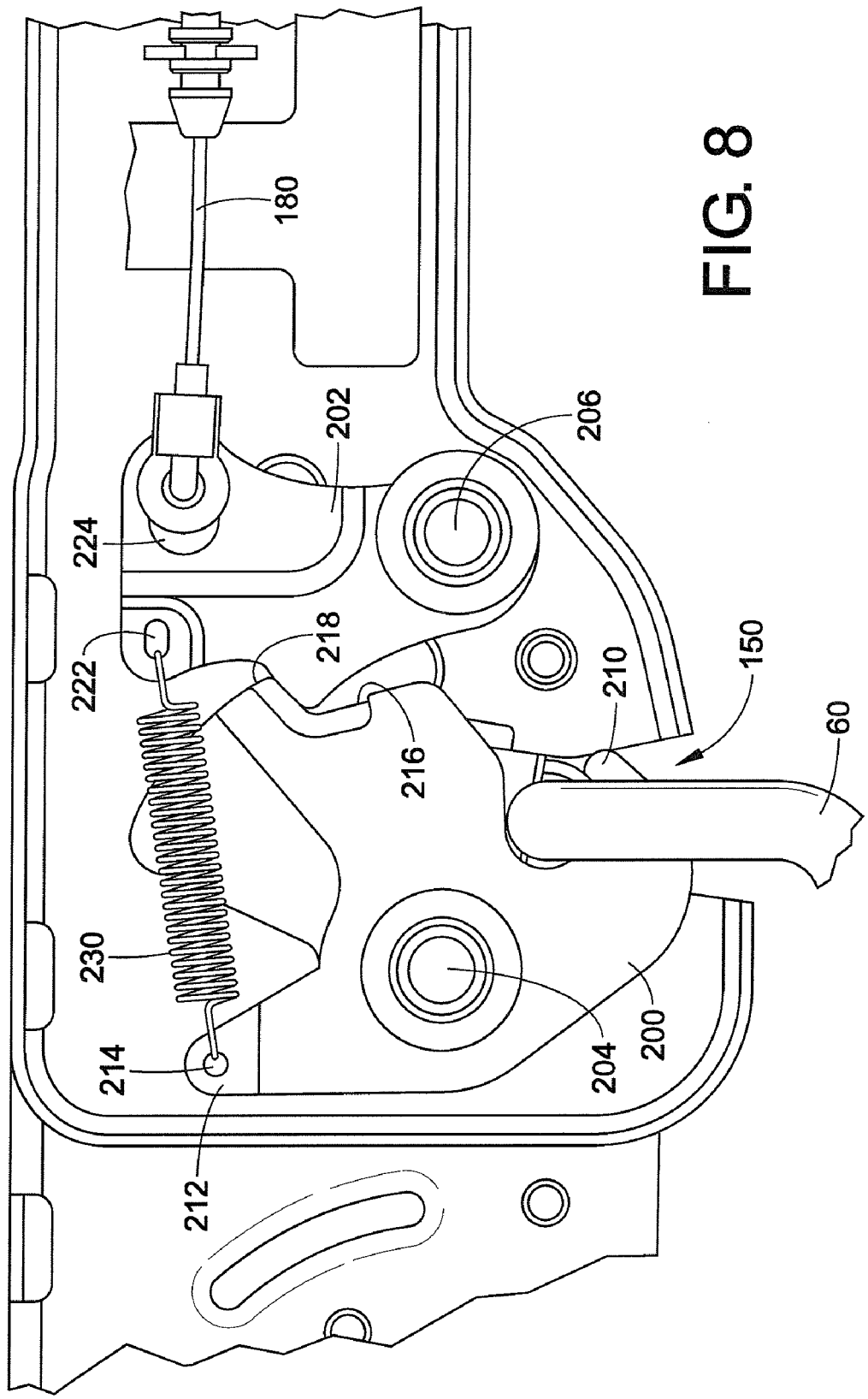
FIG. 8 is a side elevation view of a rear latch for the right-hand seat shown in FIG. 1 engaging a rear striker.

With reference to FIG. 8, the right-hand seat outer rear latch 150, which is similar in configuration to the remainder of the outboard seat rear latches, includes a hook body 200 that cooperates with a cam body 202. The hook body 200 attaches to the riser 160 using a cylindrical fastener 204 and the cam body 202 also attaches to the riser 160 using a cylindrical fastener 206. The cylindrical fasteners 204 and 206 can be conventional bolts and/or rivets. These fasteners 204, 206 are configured to allow the hook body 200 and the cam body 206, respectively, to rotate about a horizontal axis that is at the center of each cylindrical fastener.

The hook body 200 includes a hook feature 210 that engages the right-hand seat outer rear striker 60 at each of the at least two laterally spaced apart latching sections, e.g. the first latching section 102 and the second latching section 104 (see FIG. 4). The hook body 200 also includes an appendage 212. A first spring opening 214 is formed in the appendage 212. The hook body 200 also includes a cam surface 216 that acts against the cam body 202.

The cam body 202 includes a cam surface 218 that rides against the cam surface 216 of the hook body 200. The cam body 202 also includes a second spring opening 222 and a cable opening 224. A tension spring 230 connects at one end to the first spring opening 214 formed in the hook body 200 and in the second spring opening 222 formed in the cam body 202.

FIG. 8 depicts the right-hand seat outer rear latch 150 and more particularly the hook feature 210 of the hook body 200 engaging the right-hand seat outer rear striker 60. To disengage the right-hand seat outer rear latch 150, and the hook feature 210, from the right-hand seat outer rear striker 60, an operator pulls the lever arm 170 so that it rotates about the vertical axis defined by the pin 178. This results in the cable 180 moving rightward (per the orientation shown in FIG. 8) which results in the cam body 202 rotating in a clockwise direction (per the orientation shown in FIG. 8). The cam surface 218 of the cam body 202 rides against the cam surface 216 of the hook body 200 rotating the hook body 200 in a counterclockwise direction until the cam surface 218 of the cam body 202 no longer engages the cam surface 216 and the hook body 200. Accordingly, the tension spring 230 can pull the hook body 202 at the appendage 212 toward the cam body 202 resulting in pivotal movement of the hook body 200 about a horizontal axis defined by the center of the cylindrical fastener 204 in a clockwise direction (per the orientation shown in FIG. 8). It is in this position that the hook feature 218 no longer engages the right-hand seat outer rear striker 60. Accordingly, the right-hand seat 14 can be pivoted away from the right-hand seat outer rear striker 60 to the position shown in FIG. 6.

With the right-hand seat 14 pivoted away from the right-hand seat outer rear striker 60, the latching section divider 100 no longer engages the right-hand seat outer rear striker. This allows the right-hand seat 14 to be moved laterally with respect to the vehicle floor 42 (and the vehicle frame). The right-hand seat 14 can be pushed laterally inward to provide more access room for ingress to and egress from the third row seat of the vehicle. Alternatively, the right-hand seat 14 can be pulled laterally outward to increase the width between the center seat 12 and the right-hand seat 14 to allow the center seat to more easily accommodate a child seat.

A method for laterally adjusting a vehicle seat can include disengaging the rear latch, e.g. rear latches 150 and 152, of a vehicle seat, e.g. right-hand vehicle seat 14 and left-hand vehicle seat 16, from a rear striker, e.g. rear strikers 60, 62, 64 and 66, that is connected to a vehicle frame. The method could further include pivoting the vehicle seat away from the rear striker while a front latch, e.g. front latches 154 and 156, of the vehicle seat remains engaged with a front striker, e.g. the front strikers 70 and 72, that is connected to the vehicle frame. The method can further include moving the vehicle seat laterally while the rear latch is disengaged from the rear striker, the rear latch is pivoted away from the rear striker (i.e. the rear latch no longer contacts the rear striker) and the front latch is engaged with the front striker. The method can further include engaging the rear latch to the rear striker. As more clearly seen in FIG. 6, the method could further include pivoting the vehicle seat 14 to allow the rear latch 150 to clear a protrusion, e.g. the annular latching section divider 100, on the rear striker 60.

With reference back to FIG. 2, the vehicle seat arrangement also includes the mid-row garnish arrangement 40 including the outer right-hand garnish 80, the inner right-hand rear garnish 82, the inner right-hand front garnish 84, the inner left-hand rear garnish 86, the inner left-hand front garnish 88, and the outer left-hand garnish 90. As discussed above, the outer right-hand garnish 80 defines a well 120 in which the right-hand seat outer rear striker 60 and the right-hand seat outer front striker 70 are received, and the well 120 has a lateral dimension that allows for lateral adjustment of the right-hand seat 14. The inner right-hand rear garnish 82 also defines an inner well 240 and an outer well 242. The inboard seat right rear striker 44 is received in the inner well 240 and the right-hand seat inner rear striker 62 is received in the outer well 242. The inner right-hand front garnish 84 also defines an inner well 244 and an outer well 246. The inboard seat right front striker 48 is received in the inner well 244 and the right-hand seat inner front striker 72 is received in the outer well 246. The inner left-hand rear garnish 86 also defines an inner well 248 and an outer well 252. The inboard seat right-rear striker 46 is received in the inner well 248 and the left-hand seat inner rear striker 66 is received in the outer well 252. The inner right-hand front garnish 88 also defines an inner well 254 and an outer well 256. The inboard seat left-front striker 52 is received in the inner well 254 and the left-hand seat inner front striker 76 is received in the outer well 256. The outer left-hand garnish 90 also defines a well 258. The left-hand seat outer rear striker 64 and the left-hand seat outer front striker 74 are received in the well 258.

The wells 120, 242, 246, 252, 256 and 258, which each receive a striker for the outboard seats 14 and 16, have a lateral dimension that allow for lateral adjustment of the outboard seats. Accordingly, the wells 120, 242, 246, 252, 256 and 258 have a wider lateral dimension than the wells 240, 244, 248 and 254, which each receive a striker for the inboard seat 12. The wells 120, 242, 246, 252, 256 and 258 that receive the outboard seat strikers 60, 62, 64, 66, 60, 72, 74 and 76 can have a lateral dimension that is at least about twice the lateral dimension of the wells 240, 244, 248 and 254 that receive the inboard (center) seat strikers 44, 46, 48 and 52.

With continued reference to FIG. 2, the center seat strikers 44, 46, 48 and 52, which are also generally U-shaped, have a smaller lateral dimension than the outboard seat strikers 60, 62, 64, 66, 60, 72, 74 and 76. More particularly, the lateral dimension of the outboard seat rear strikers can be at least about twice the lateral dimension of the inboard seat rear strikers. As mentioned above, the outboard seats 14 and 16 are laterally adjustable. In the depicted embodiment, however, the inboard (center) seat 12 is not laterally adjustable. Accordingly, the latches for the outboard seats 14 and 16 engage the respective outboard seat strikers, 60, 62, 64, 66, 60, 72, 74 and 76 at least two latching locations, e.g. latching sections 102 and 104 shown in FIG. 3. Since the center seat is fixed in the lateral direction, the center seat strikers 44, 46, 48 and 52 can have the smaller lateral dimension.

With reference back to FIG. 4, the right-hand seat 14 can also include a locator feature 270 that cooperates with the locator wall 122 on the outer right-hand garnish 80. The locator feature 270 can be a part of the outer riser 160 (see FIG. 7). When the right-hand seat rear latch 150 is in the first operating position, as shown in FIG. 4, the locator feature 270 can engage the locator wall 122 to inhibit outward movement of the right-hand seat 14. When the right-hand seat rear latch 150 is in the second operating position, which is shown in FIG. 5, the locator feature 270 can engage the locator wall 122 to inhibit inward movement of the right-hand seat 14. The left-hand seat can include a similar locator feature.

A laterally adjustable vehicle seat has been described with particularity. Modifications and alterations will occur to those upon reading and understanding the preceding detailed description. For example, the latching section dividers can be located on inner rear latches as opposed to outer rear latches, or the rear latches for the outboard seats can connect with a striker in a high latch arrangement where the striker is connected with a vehicle pillar. The invention is not limited only to the embodiments described above. Instead, the invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat arrangement comprising:
a plurality of strikers including at least two outboard seat rear strikers and an outboard seat front striker, wherein at least one of the outboard seat rear strikers includes a latching section divider dividing the at least one outboard seat rear striker into at least two laterally spaced apart latching sections;
an inboard vehicle seat; and
an outboard vehicle seat including at least two outboard seat rear latches that each cooperates with a respective outboard seat rear striker and an outboard seat front latch that cooperates with the outboard seat front striker, wherein the outboard seat is in a same row as and laterally offset from the inboard seat, the outboard seat being adjustable in a lateral direction and at least one of the outboard seat rear latches being configured to engage the at least one outboard seat rear striker at each of the at least two laterally spaced apart latching sections.

2. The vehicle seat arrangement of claim 1, wherein when the outboard seat rear latches are disengaged from the respective outboard seat rear strikers and the outboard seat front latches are engaged with the respective outboard seat front strikers, the vehicle seat is pivotable about an axis generally defined by the outboard seat front strikers and the vehicle seat is movable in the lateral direction.

3. The vehicle seat arrangement of claim 1, wherein the at least one outboard seat rear latch is operable in a first operating position, a second operating position and a third operating position, in the first operating position the at least one outboard seat rear latch engages the at least one outboard seat rear striker at a first latching section of the at least two latching sections, in the second operating position the at least one outboard seat rear latch engages the at least one outboard seat rear striker at a second section of the at least two latching sections, and in the third operating position the at least one outboard seat rear latch is disengaged from the at least one outboard seat rear striker.

4. The vehicle seat arrangement of claim 3, wherein the latching section divider contacts the at least one outboard seat rear latch to preclude lateral movement of the at least one outboard seat rear latch from the first latching section toward the second latching section when the at least one outboard seat rear latch is in the first operating position.

5. The vehicle seat arrangement of claim 1, further comprising a garnish adjacent the outboard seat strikers, the garnish including a locator wall aligned with the latching section divider in a longitudinal direction, the locator wall cooperating with the outboard seat to locate the vehicle seat in the lateral direction.

6. The vehicle seat arrangement of claim 5, wherein the locator wall is disposed between the outboard seat rear striker and the outboard seat front striker.

7. The vehicle seat arrangement of claim 5, wherein the outboard seat includes a locator feature selectively cooperating with the locator wall.

8. The vehicle seat arrangement of claim 1, wherein the latching section divider is annular ridge.

9. The vehicle seat arrangement of claim 8, wherein the at least one outboard seat rear striker is generally U-shaped having a circular cross section and the latching section divider surrounds the circumference of the circular cross section.

10. The vehicle seat arrangement of claim 1, wherein the outboard seat includes a left hand mid-row seat and a right hand mid-row seat.

11. The vehicle seat arrangement of claim 10, wherein the inboard seat is laterally disposed between the left hand mid-row seat and the right hand mid-row seat.

12. The vehicle seat arrangement of claim 1, further comprising an inboard seat rear striker for mounting the inboard seat to the vehicle frame, wherein the inboard seat rear striker has a smaller lateral dimension than the outboard seat rear strikers.

13. The vehicle seat arrangement of claim 12, wherein the lateral dimension of the outboard seat rear strikers is at least about twice the lateral dimension of the inboard seat rear striker.

14. The vehicle seat arrangement of claim 6, wherein a width measured in the lateral direction of the locator wall is substantially equal to a width measured in the lateral direction of the latching section divider.

15. The vehicle seat arrangement of claim 7, wherein the outboard vehicle seat includes an outer riser, at least one of the outboard seat rear strikers mounts to the outer riser, wherein the locator feature is a part of the outer riser.

* * * * *